United States Patent [19]

Heglund

[11] Patent Number: 5,850,133

[45] Date of Patent: Dec. 15, 1998

[54] OUTPUT OVERLOAD AND FAULT TOLERANT COMMUTATION METHOD FOR A SWITCHED RELUCTANCE GENERATOR AND AN ELECTRIC POWER GENERATING SYSTEM EMPLOYING SAME

[75] Inventor: William S. Heglund, Davis Junction, Ill.

[73] Assignee: Sundstrand Corporation, Rockford, Ill.

[21] Appl. No.: 837,261

[22] Filed: Apr. 10, 1997

[51] Int. Cl.$^6$ .................................................. H02P 1/46
[52] U.S. Cl. ....................... 318/700; 318/701; 318/254; 318/439; 318/138
[58] Field of Search ................................. 318/701, 700, 318/254, 439, 138

[56] References Cited

U.S. PATENT DOCUMENTS

| | | |
|---|---|---|
| 3,956,678 | 5/1976 | Byrne et al. . |
| 4,253,053 | 2/1981 | Ray et al. . |
| 4,387,326 | 6/1983 | Ray et al. . |
| 4,500,824 | 2/1985 | Miller . |
| 4,513,218 | 4/1985 | Hansen . |
| 4,595,865 | 6/1986 | Jahns . |
| 4,611,157 | 9/1986 | Miller et al. . |
| 4,642,543 | 2/1987 | MacMinn . |
| 4,684,867 | 8/1987 | Miller et al. . |
| 4,707,650 | 11/1987 | Bose . |
| 4,713,594 | 12/1987 | Bose et al. . |
| 4,739,240 | 4/1988 | MacMinn et al. . |
| 4,772,839 | 9/1988 | MacMinn et al. . |
| 4,896,088 | 1/1990 | Jahns . |
| 4,896,089 | 1/1990 | Kliman et al. . |
| 4,916,346 | 4/1990 | Kliman . |
| 4,918,831 | 4/1990 | Kliman . |
| 4,933,621 | 6/1990 | MacMinn et al. . |
| 4,943,760 | 7/1990 | Byrne et al. . |
| 4,959,596 | 9/1990 | MacMinn et al. . |
| 5,012,171 | 4/1991 | Sember . |

(List continued on next page.)

FOREIGN PATENT DOCUMENTS

| | | | |
|---|---|---|---|
| 05640607 | 6/1993 | European Pat. Off. .......... | H02P 9/10 |
| WO95/24072 | 8/1995 | WIPO .............................. | H02P 7/36 |

OTHER PUBLICATIONS

An Article entitled "Microcomputer Control of Switched Reluctance Motor" B.K. Boxe, T.J.E. Miller, P.M. Szczeny, and W.H. Bicknell. CH2207–9/85/0000–0542501.00 1985 IEEE.

Draft of an article entitled "Performance of a New Commutation Approach for switched Reluctance Generators" written by William by Heglund and Stephen Jones of Sunstrand Corporation.

Article entitled "Design Considerations for the Switched Reluctance Motor" by A.V. Radun, University of Kentucky, 453 Anderson Hall, Lexington, KY 40506–0046.

SAE Technical Paper Series article entitled Switched Reluctance Starter/Generator by Arthur Radun, James Rulison & Peter Sanz of GE Corporate Research & Development.

(List continued on next page.)

*Primary Examiner*—Karen Masih
*Attorney, Agent, or Firm*—Jeffery J. Makeever; Kevin L. Wingate

[57] ABSTRACT

A method of commutation of a switched reluctance machine to allow operation in a generate mode comprises the steps of closing upper and lower switches coupling a stator winding to a power bus during an increase in the inductance of a stator winding to allow a flow of current from the power bus through the winding, opening one of the upper and lower switches when the current reaches a first predetermined value, opening the closed of the upper and lower switches during a decrease in the inductance of a stator winding, and closing one of the upper and lower switches during a period of non-alignment of the rotor and stator pole. The method further includes the step of closing both the upper and lower switches if the monitored current falls below a second predetermined value. In this way, the current through the stator winding is not allowed to decay to zero.

20 Claims, 11 Drawing Sheets

U.S. PATENT DOCUMENTS

| | | | |
|---|---|---|---|
| 5,051,680 | 9/1991 | Belanger | 318/701 |
| 5,084,662 | 1/1992 | Palaniappan et al. | 318/701 |
| 5,111,091 | 5/1992 | Bahn . | |
| 5,166,591 | 11/1992 | Stephens et al. | 318/701 |
| 5,563,488 | 10/1996 | Stephenson et al. | 318/701 |

OTHER PUBLICATIONS

Article entitled "Direct Modeling of Switched Reluctance Machine By Coupled Field–Circuit Method" by Longya Xu, Ohio State University Dept. of Electrical Engineering & Erik Ruckstader of Wright Patterson Laboratory, AFB, Dayton, Ohio appearing in IEEE Transactions on Energy Conversion, 1995.

Article entitled "Performance Evaluation of a Switched Reluctance Starter/Generator System Under Constant Power and Capacitive Type Loads" written by Caio Ferreira, Stephen R. Jones and William S. Heglund of Sundstrand Corporation, Rockford, IL.

Article entitled: "Detailed Design of a 30–kW Switched Reluctance Starter/Generator System for a Gas Turbine Engine Application" written by Caio Ferreira, Stephen Jones, William Heglund and William Jones, appearing in IEE Transactions On Industry Applications, May/Jun. 1995.

Article entitled "Two Channel Switched Reluctance Starter/Generator Results" by A. V. RAdun, C. A. Ferreira and E. Richter.

Article entitled "Generating With the Switched Reluctance Motor" by Arthur Radun Dep. of Electrical Engineering, University of Kentucky.

5,850,133

OUTPUT OVERLOAD AND FAULT TOLERANT COMMUTATION METHOD FOR A SWITCHED RELUCTANCE GENERATOR AND AN ELECTRIC POWER GENERATING SYSTEM EMPLOYING SAME

FIELD OF THE INVENTION

The present invention relates generally to commutation methods for switched reluctance machines, and more particularly to a method of commutating a switched reluctance machine in a generate mode to allow increased output power generation at the system design voltage allowing the system to sustain output overloads, low impedance faults, and output short circuits.

BACKGROUND ART

The continued advances in high power switching semiconductors and control electronics have enabled switched reluctance machines, which have been used extensively in motor applications with great success in the past, to be exploited increasingly for the generation of electric power. Such use is highly desirable in light of the simple and rugged winding-free, magnet-free, brushless construction of the salient pole rotor. This rugged construction allows the machine to be run at high speeds and in very harsh environmental conditions. Additionally, since the rotor does not have windings or magnets, its cost is less than a wound or permanent magnet rotor.

A typical commutation approach which is used to allow this generation of electric power with a switched reluctance machine is illustrated by the simplified schematics of FIGS. 1a and 1b viewed in conjunction with the graphs of FIG. 2. As the rotor rotates, the inductance of the stator winding varies as the salient rotor poles come in and out of alignment with the stator poles, as illustrated by trace 20 of FIG. 2. To allow electric power generation, the switches 22, 24 (typically electronic semiconductor devices) are closed to allow current to flow from the bus 26 to energize the stator winding 28 as indicated by arrows 30, 32. This turn-on occurs at a turn-on angle after alignment of the rotor and stator pole has begun, as indicated as axis 34 on FIG. 2 (indicated as TURN_ON). Once both switches 22, 24 are closed, the current through the stator winding 28 increases as indicated by trace 36 on FIG. 2. At axis 38, the rotor pole and the stator pole are aligned and the inductance peaks. After this point the inductance begins to decrease, which results in a rapidly increasing current. Once this increasing current exceeds the upper current limit ($I_{HI}$) at axis 44, both switches 22, 24 are opened (see FIG. 1b) and the current is returned to the bus 26 through diodes 40, 42. Due to the decreasing inductance during this phase, the current delivered to the bus continues to increase. Once, however, the rotor and stator pole are unaligned beginning at axis 46, the inductance has reached its minimum value (at which it remains until the rotor and stator poles begin to come into alignment again). During this period, the current delivered to the bus decays until it reaches zero. Because more current is generated during the decrease in inductance as the rotor pole pulls away from the stator pole than is required to be supplied by the bus, a net generation of electric power occurs.

A problem inherent with this typical commutation approach, however, becomes apparent during a fault condition. Since this commutation approach utilizes the bus voltage to generate the stator winding excitation, a short circuit or low impedance fault on the bus will depress the bus voltage. This, in turn, will result in less current to excite the stator winding. With less excitation current available, the switch turn off point ($I_{HI}$) will not be reached until much later in the cycle, if at all, resulting in more power being extracted from the bus than returned to it. As the fault persists, a point may be reached where no current is returned to the bus, and the bus voltage collapses to zero. Also, this commutation approach suffers from a lag in bus voltage recovery after the application of a large load because of the time required to build the excitation from zero amps to an increased demand point (as $I_{HI}$ is moved up to allow the bus voltage to recover to its regulated value with the additional load connected).

One architecture used to prevent the collapse of bus voltage during a short circuit or low impedance fault is a split bus arrangement as is illustrated schematically in FIG. 3 in a three phase embodiment. As may be seen, the excitation of the stator windings 28 during a fault condition as described above is facilitated by a separate dc source 48. While this system architecture alleviates the problem of having the bus voltage collapse, it does require increased complexity as well as a separate dc supply which increases the cost and weight of the overall system. However, even with the impact to cost and weight, this architecture is seen as a marked improvement over the system of FIG. 1. This architecture still suffers from the bus voltage recovery lag upon application of system load however because it utilizes the same commutation approach described above with reference to FIGS. 1 and 2.

Another problem inherent with the known commutation approach is the output current ripple. Switched reluctance machines provide power to the output as a sum of current pulses from the individual phases. Although the phase current is unidirectional, the contribution of the individual phase current to the bus current is bidirectional and this results in the current ripple at the inverter output. The magnitude of the current ripple has a significant impact on the amount of filtering necessary to provide a clean voltage source. Present commutation approaches provide only limited ability to reduce the current ripple characteristics of a switched reluctance generator.

It is an object of the instant invention, therefore, to overcome these and other problems present in the art.

SUMMARY OF THE INVENTION

It is the principle objective of the invention to provide a new and improved commutation method for a switched reluctance machine and a system utilizing same. More specifically, it is the principle objective of the instant invention to provide a commutation method for a switched reluctance machine allowing operation in the generate mode and which will allow continued operation during output overloads, low impedance faults, and short circuits, and which provides reduced output current ripple.

An exemplary switched reluctance machine suitable for application of the method of the instant invention comprises a stator having a plurality of wound stator poles whose windings are electrically coupled in pairs. These pairs are switchably coupled by an upper and a lower switch to a bus capable of supplying excitation power to the windings, and by an upper and a lower unidirectional current flow device to a bus capable of supplying electric power to utilization equipment. This machine further comprises a rotor which is rotatably mounted within the stator and which is drivably coupled to an external source of rotational energy. The rotor has a plurality of salient poles, the rotation of which causes the inductance of the stator windings to vary. An embodiment of the instant invention used with this type of machine comprises the steps of closing the upper and lower switches during an increase in the inductance of a stator winding, monitoring a flow of current through the stator winding, opening one of the upper and lower switches when the monitored current reaches a first predetermined value, opening the closed of the upper and lower switches during a decrease in the inductance of a stator winding, and closing one of the upper and lower switches during a period of non-alignment of the rotor and stator pole.

In a preferred embodiment of the instant invention, the method additionally comprises the step of closing both the upper and lower switches if the monitored current falls below a second predetermined value. In this way, the current flowing through the stator windings is not allowed to decay to zero. Preferably, the closing of both switches is accomplished at a fixed angle prior to alignment of the rotor and stator pole, the opening of the closed switch is accomplished at a fixed angle after alignment of the rotor and stator pole, and the closing of one of the upper and lower switches is accomplished at a fixed angle during a period of non-alignment alignment of the rotor and stator pole. Further, a highly preferred embodiment of the method of the instant invention comprises the steps of monitoring a voltage on the bus capable of supplying electric power to utilization equipment, and varying the first predetermined value inversely to a variation in the monitored voltage.

In an alternative embodiment of the method of the instant invention the commutation of the switched reluctance machine to allow operation in a generate mode comprises the steps of exciting the stator winding during a first phase, generating current during a second phase, and freewheeling the stator winding during a third phase. Preferably, the method further comprises the steps of monitoring current flow through the stator winding, and freewheeling the stator winding during the first phase if the monitored current exceeds a first current limit. The method further comprises the step of exciting the stator winding during the third phase if the monitored current falls below a second current limit.

An electric power generating system built in accordance with the instant invention comprises a switched reluctance machine having a wound stator and a salient pole rotor rotatably mounted therein and drivably coupled to a source of rotational energy. The stator has a plurality of poles wound with a winding to form pole pairs. The system further includes a power bus having a positive feeder and a return. A first switch switchably coupling a first end of the winding to the positive feeder, and a second switch switchably coupling the second end of the winding to the return. The system includes a first diode coupled between the second end of the winding and the positive feeder, and a second diode coupled between the first end of the winding and the return. Voltage sensing circuitry is utilized to monitor the voltage level on the positive feeder, and current sensing circuitry is utilized to monitor the current flowing in the winding. Additionally, rotor position sensing circuitry is utilized to monitor an angular position of the rotor. The system also includes a controller which is responsive to the monitored voltage, current, and rotor angle.

This controller commutates the switched reluctance machine in a generate mode by commanding the first and second switches closed at a fixed angle prior to alignment of the rotor and stator pole, commanding the first and second switches open at a fixed angle after alignment of rotor and stator poles, and thereafter commanding one of the first and second switches closed at a fixed angle of non-alignment of the rotor and stator poles. In a preferred embodiment of the instant invention, the controller maintains a current flow through the winding at all times during operation by commanding both of the switches closed when the monitored current droops below a lower current limit. Additionally, the controller of a preferred embodiment commands one of the switches open when the monitored current exceeds an upper current limit. This upper current limit, in a preferred embodiment of the instant invention, is varied by the controller inversely with the monitored voltage to regulate the voltage at a desired level.

Other objectives and advantages will become apparent from the following specification taken in conjunction with the accompanying drawings.

BRIEF DESCRIPTION OF THE DRAWINGS

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings in which:

DESCRIPTION OF THE PREFERRED EMBODIMENTS

Figure 4:
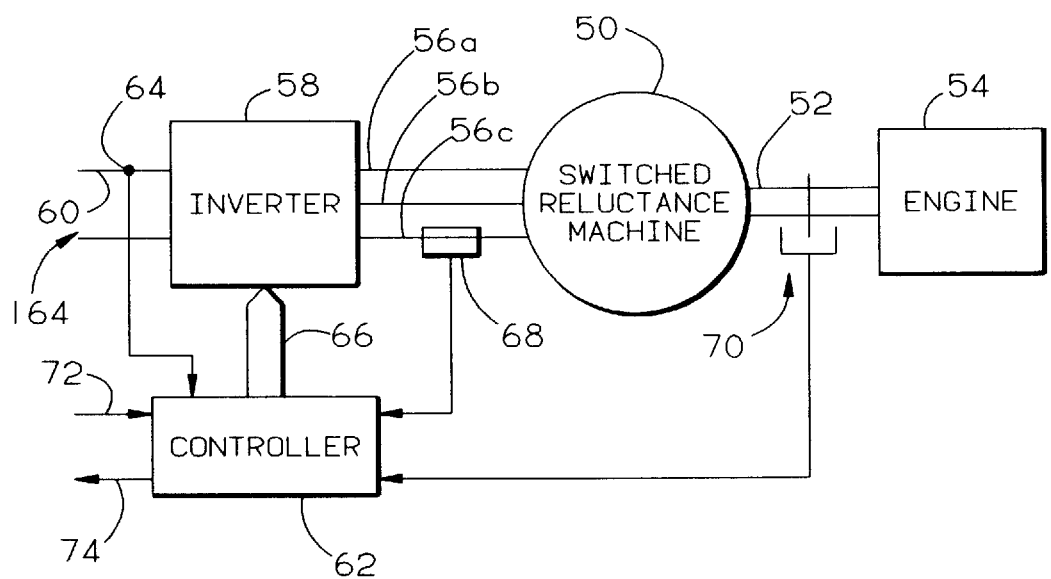
FIG. 4 is a system level block diagram to which the instant invention is particularly applicable.

An embodiment of the electric power generating system of the instant invention, as illustrated in FIG. 4, comprises a switched reluctance machine 50 having a rotor (not shown) drivably coupled by shaft means 52 to a turbine engine 54. The shaft means 52 may preferably provide direct coupling to the engine 54, or may provide coupling through appropriate gearing or differentials as desired. Additionally, the shaft means 52 may be integral to the engine and the switched reluctance machine 50 provided integrally therein. The machine 50 is electrically coupled by a plurality of phase leads 56a, 56b, 56c to an inverter 58, which is electrically coupled by a dc input/output 164 to a dc distribution bus 60. A controller 62 monitors this dc distribution bus 60 at a point of regulation 64, and provides control signals 66 to the inverter 58. Current sensing means 68 are used to monitor current flow in the phase leads 56a, 56b, 56c, and rotor position resolving means 70 are used to monitor rotor position and speed. As will be recognized by one skill in the art, resolution of the rotor position and speed may be by electronic means as well as through a resolver. External system communications, including control inputs 72 and status outputs 74, are also provided through the controller.

Figure 5:
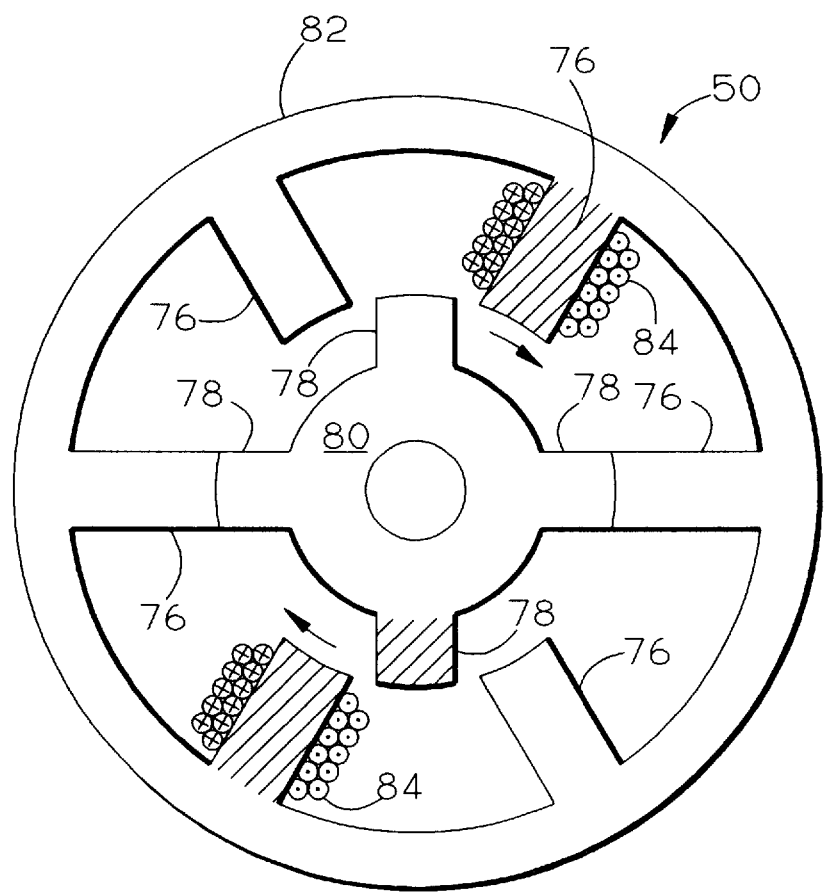
FIG. 5 is a diagrammatic cross section of a switched reluctance machine applicable to the instant invention.

This system is preferably a high voltage dc system, although the concepts described herein have equal applicability to a dc link variable speed constant frequency (VSCF) system. Preferably, the electric power generating system described herein is a 270 volt dc system with power quality as defined by applicable industry standards, such as MIL-STD-704E and others. The control for this system allows bi-directional electric power flow to maintain this power quality in the presence of both net dissapative and net regenerative loads. The switched reluctance machine topology, as illustrated by the cross section of FIG. 5, utilizes a first plurality of salient stator poles 76 and a second plurality of salient rotor poles 78. Advantageously, a 6/4 topology having six stator poles 76 and four rotor poles 78 is used. As is recognized by one skilled in the art, a different topology could be utilized with corresponding changes in the inverter 58 and the controller 62 without departing from the scope of the invention.

Figure 3:
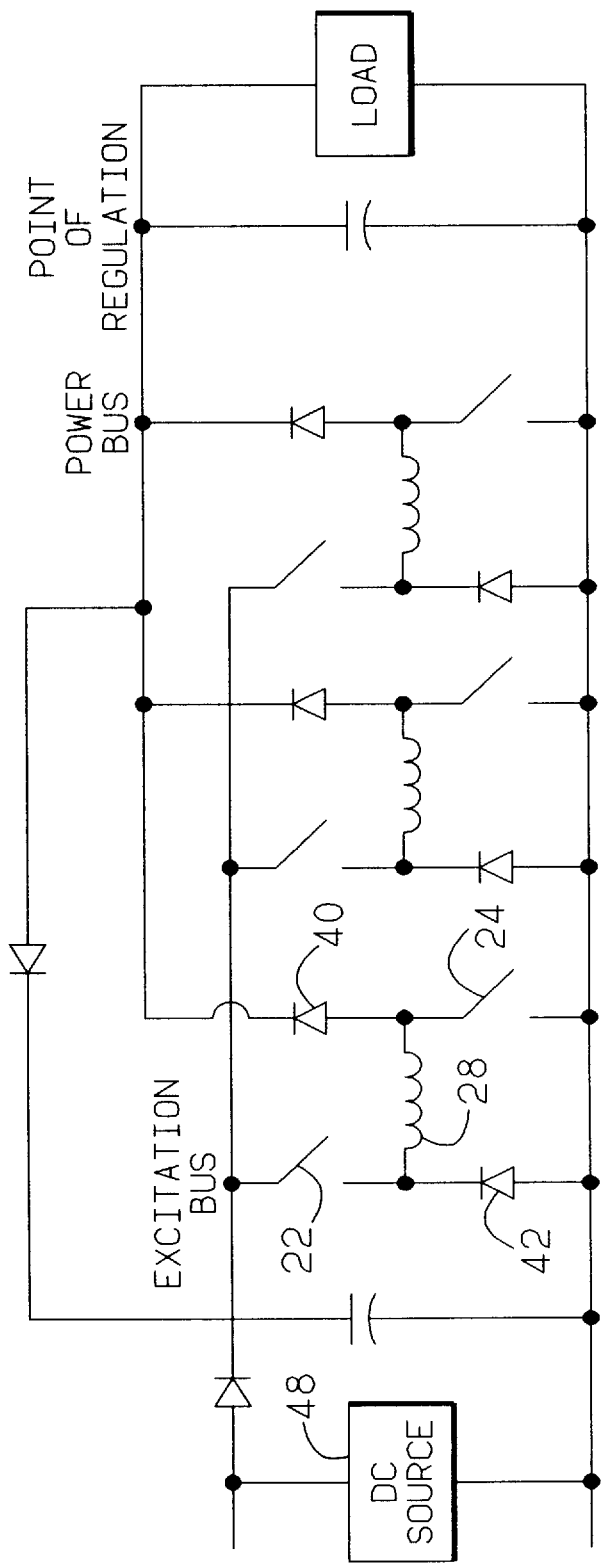
FIG. 3 is a simplified schematic diagram illustrating an alternate switched reluctance architecture.
Figure 6:
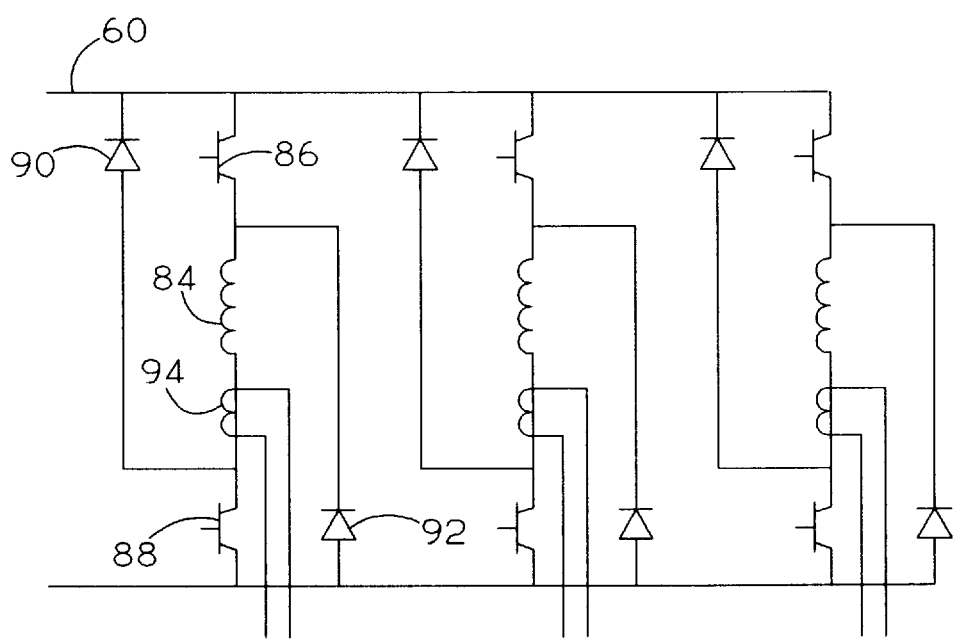
FIG. 6 is a single line electrical schematic diagram of an embodiment of the instant invention.

Referring back to FIG. 4, the inverter 58 is also capable of receiving power from the dc distribution bus 60 to perform engine starting as is known in the art, in addition to providing voltage regulation on the dc distribution bus 60 during generation mode, thus realizing a greater system weight savings through further integration. A three phase inverter topology (bridge topology) suitable for use with the commutation method of the instant invention, as illustrated in FIG. 6, comprises switching means, such as the two switches 86, 88, and commutation means, such as the two diodes 90, 92, for each stator pole phase winding 84. Each phase of the inverter 58 is identical, and, therefore, only one phase will be described in detail herein. The switched reluctance machine phase winding 84 is in series with both switches 86, 88. As the switches 86, 88 are gated into conduction or enabled, current flows from the dc distribution bus 60 to energize the winding 84. This current is monitored by current sensing means, such as current sensors 94, having a bandwidth extending from dc to greater than 50 kHz, which is included in each phase to provide feedback of the instantaneous phase current to the controller 62 (FIG. 4). When the switches 86, 88 are gated out of conduction or disabled, the current is forced to communicate through the cross-coupled diodes 90 and 92 because the direction and magnitude of current flow through the winding 84 cannot change instantaneously. Preferably, the switches 86, 88 are insulated gate bipolar transistors (IGBTs), although other power switching devices such as MOS-controlled thyristors (MCT), static induction transistors (SITs), et cetera, may be use as appropriate. As will be recognized by one skilled in the art, the split bus topology illustrated in FIG. 3 may also be operated in accordance with the commutation method of the instant invention, as may other topologies as appropriate.

Figure 7A:
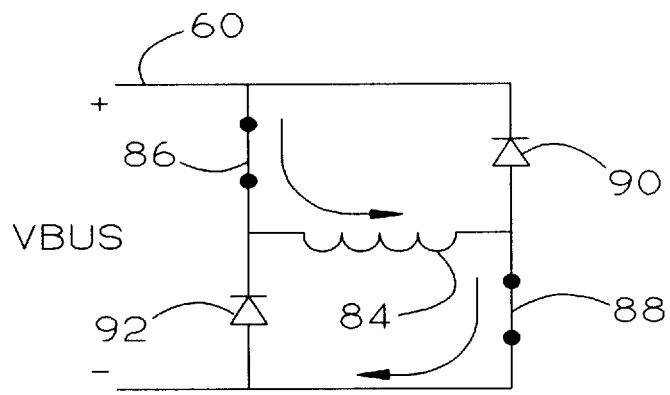
FIGS. 7*a–c* are simplified schematic diagrams illustrating stages of switched reluctance commutation utilized in an embodiment of the instant invention.
Figure 7B:
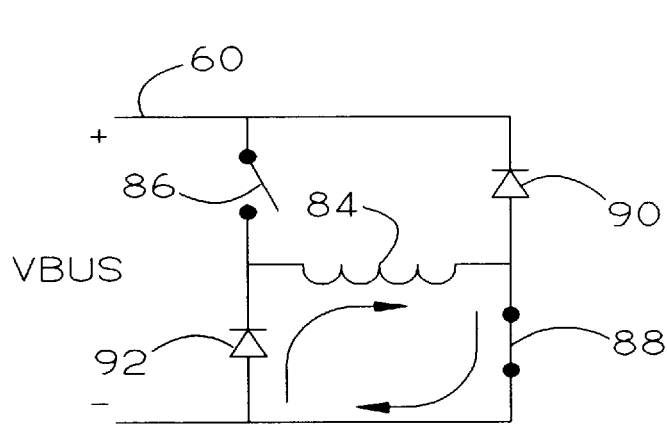
Figure 7C:
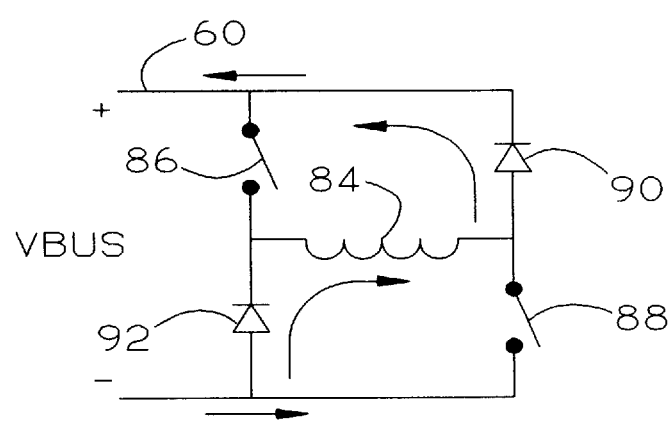
Figure 8:
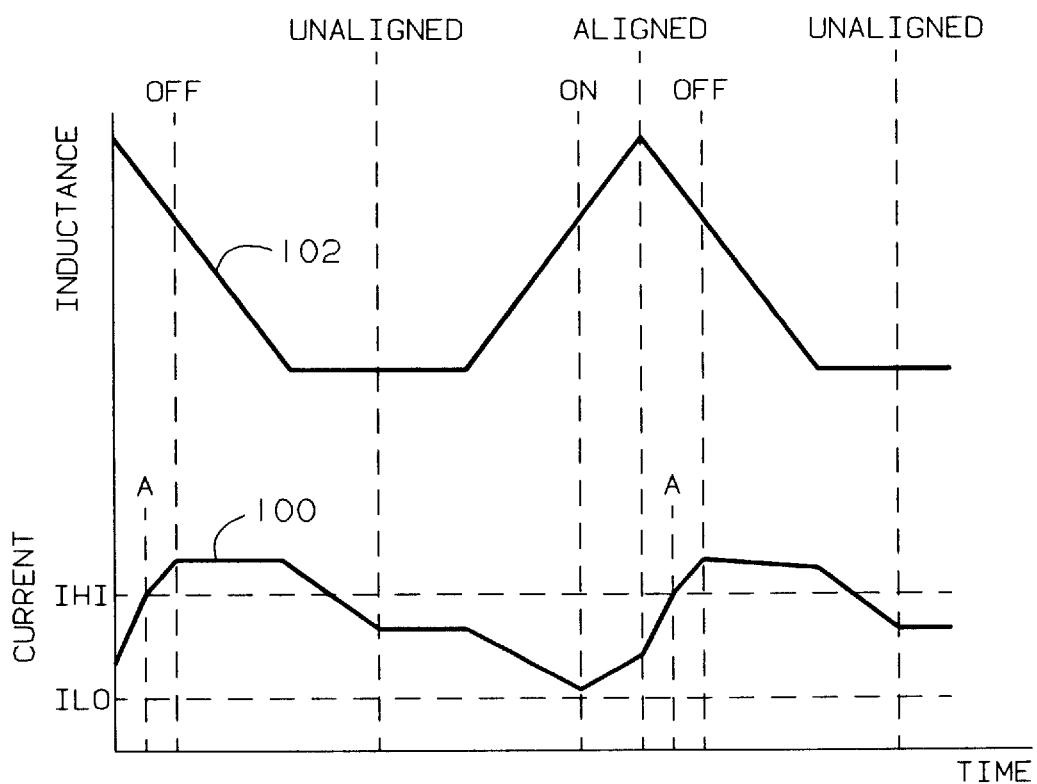
FIG. 8 is a graphical illustration of the stator winding inductance and current versus time during an embodiment of the generate mode commutation approach of the instant invention.
Figure 9:
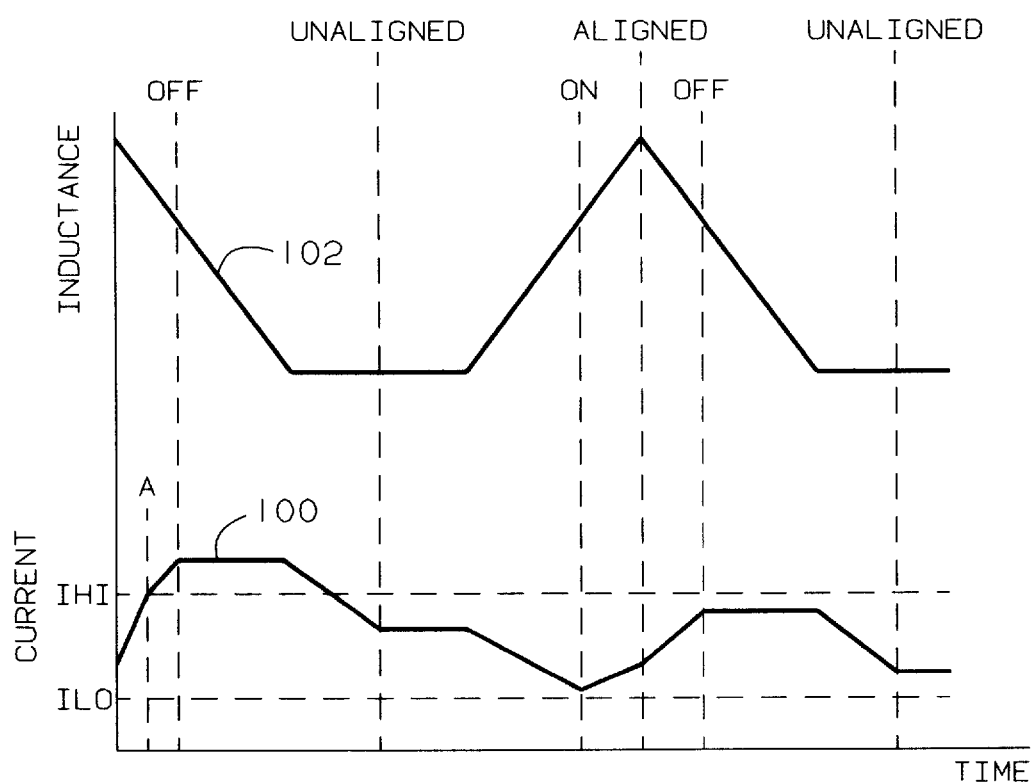
FIG. 9 is a graphical illustration of the stator winding inductance and current versus time during an embodiment of the generate mode commutation approach of the instant invention.
Figure 10:
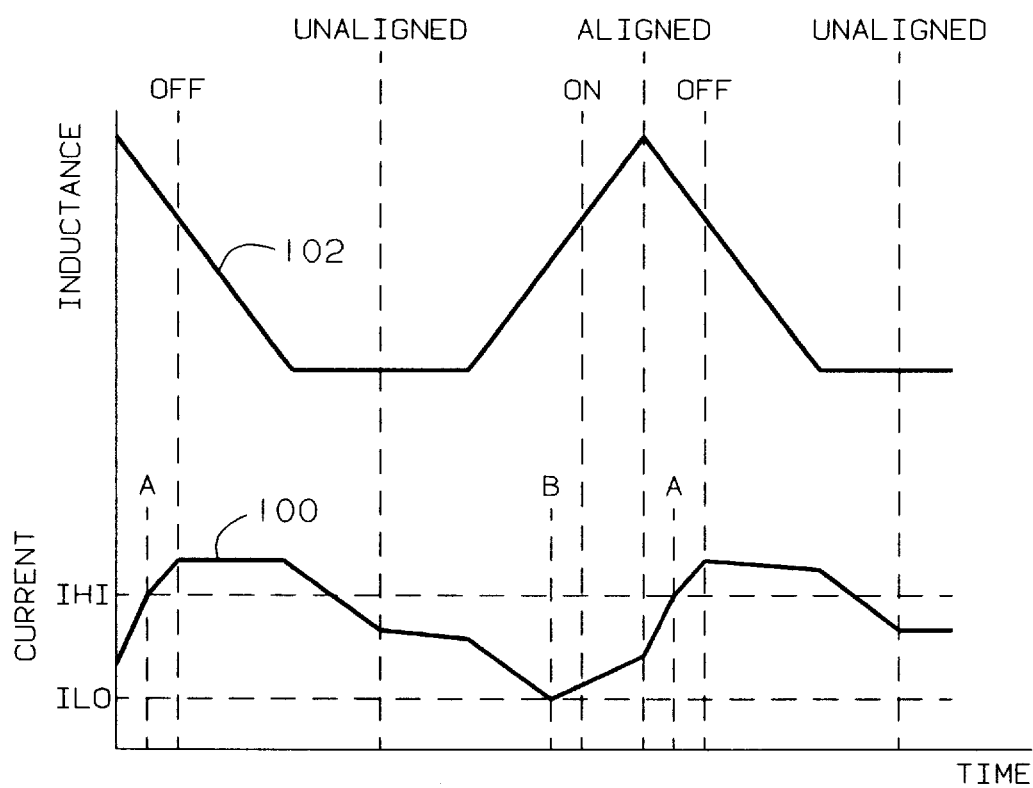
FIG. 10 is a graphical illustration of the stator winding inductance and current versus time during an embodiment of the generate mode commutation approach of the instant invention.

The three switch configurations utilized during each phase of the preferred commutation method of the instant invention are illustrated in FIGS. 7a, 7b, and 7c, and will be referred to during the discussion of FIGS. 8, 9, and 10. The first switch configuration is illustrated in FIG. 7a and will be referred to as the excite configuration. During this excite configuration both switches 86, 88 are closed and current is allowed to flow from the bus 60 through the stator winding 84 as indicated by the current flow arrows. The second switch configuration is illustrated in FIG. 7b and will be referred to as the freewheeling configuration. During this freewheeling configuration one of the switches, 86 or 88, is closed while the other one is opened, 88 or 86. The current through the winding 84 is allowed to continue to flow through the closed switch (86 or 88) and one of the diodes (92 or 90). While FIG. 7b illustrates switch 88 being closed and switch 86 being opened, one skilled in the art will recognize that this situation may be reversed without degradation of performance or departure from the invention. The third switch configuration is illustrated in FIG. 7c and will be referred to as the generate configuration. During this generate configuration both switches 86 and 88 are opened and the current through winding 84 flows through diodes 92 and 90 back to bus 60 as indicated by the current flow arrows.

FIG. 8 illustrates the current flow through one phase of the stator windings versus time as plotted with the varying inductance of the winding resulting from the rotation of the rotor. The commutation method of the instant invention utilizes three (3) control angles (ON, OFF, and UNALIGNED) and two (2) control current thresholds $I_{HI}$ and $I_{LO}$) to control the entry and exit of each of the phases of operation. For reference, the UNALIGNED position is when the rotor and stator poles are unaligned having minimum phase inductance, and the ALIGNED position is when the rotor and stator poles are aligned having maximum phase inductance. The ON angle is located between the UNALIGNED and the ALIGNED position, preferably during an increase in the phase inductance. The OFF angle is located between the ALIGNED and the UNALIGNED position, preferably during a decrease in the phase inductance. In an embodiment of the instant invention, the ON and OFF angles and the $I_{LO}$ value are fixed or constant, although it is within the scope of the instant invention for these control parameters to be variable. The $I_{HI}$ control variable is output from a proportional/integral (PI) voltage controller as is known in the art. The control variable, $I_{HI}$, to maintain the output voltage at a regulation point, varies inversely with the output voltage.

Starting at the left of FIG. 8, both switches 86, 88 are closed and the excitation current is building (see FIG. 7a). At the point "A" in FIG. 8, the current 100 has just exceeded $I_{HI}$ and one of the switches 86 or 88 is opened to allow the current through winding 84 to freewheel (see FIG. 7b). The current continues to increase due to the decreasing inductance 102. When the rotor reaches the OFF position, both of the switches 86, 88 are opened and the phase current is delivered to the bus 60 (see FIG. 7c). Depending on the machine characteristics and the speed, the phase current may decrease, remain constant, or increase. When the rotor reaches the UNALIGNED position, one of the switches 86, 88 is closed to allow the current to freewheel (see FIG. 7b). This maintains the flux at approximately a constant level. As the rotor approaches the ON position, the current will decrease due to the increasing inductance. When the rotor angle exceeds the ON angle, both switches 86, 88 are closed and the excitation portion of the commutation cycle begins and the phase current increases. The current will increase until it reaches $I_{HI}$ (at point "A") and the cycle repeats.

The graphs of FIG. 9 illustrate the situation where the current does not reach the $I_{HI}$ current threshold before the OFF angle is reached by the rotor on the second cycle. Starting at the left of FIG. 9, both switches 86, 88 are closed and the excitation current is building (see FIG. 7a). At the point "A" in FIG. 9, the current 100 has just exceeded $I_{HI}$ and one of the switches 86 or 88 is opened to allow the current through winding 84 to freewheel (see FIG. 7b). The current continues to increase due to the decreasing inductance 102. When the rotor reaches the OFF position, both of the switches 86, 88 are opened and the phase current is delivered to the bus 60 (see FIG. 7c). Depending on the machine characteristics and the speed, the phase current may decrease, remain constant, or increase. When the rotor reaches the UNALIGNED position, one of the switches 86, 88 is closed to allow the current to freewheel (see FIG. 7b). This maintains the flux at approximately a constant level. As the rotor approaches the ON position, the current will decrease due to the increasing inductance. When the rotor angle exceeds the ON angle, both switches 86, 88 are closed and the excitation portion of the commutation cycle begins and the phase current increases. In this situation, unlike that of FIG. 8, $I_{HI}$ is not reached during the excitation phase, and the switch configuration transitions directly from the excite configuration (FIG. 7a) to the generate configuration (FIG. 7c) once the OFF angle is reached, bypassing the freewheeling configuration (FIG. 7b) at this stage. On subsequent cycles, however, the freewheeling stage will be entered if the $I_{HI}$ threshold is again reached prior to the OFF angle being reached by the rotor.

The graphs of FIG. 10 illustrate the situation where the current decays or droops below the $I_{LO}$ current threshold before the ON angle is reached by the rotor. Starting at the left of FIG. 10, both switches 86, 88 are closed and the excitation current is building (see FIG. 7a). At the point "A" in FIG. 10, the current 100 has just exceeded $I_{HI}$ and one of the switches 86 or 88 is opened to allow the current through winding 84 to freewheel (see FIG. 7b). The current continues to increase due to the decreasing inductance 102. When the rotor reaches the OFF position, both of the switches 86, 88 are opened and the phase current is delivered to the bus 60 (see FIG. 7c). Depending on the machine characteristics and the speed, the phase current may decrease, remain constant, or increase. When the rotor reaches the UNALIGNED position, one of the switches 86, 88 is closed to allow the current to freewheel (see FIG. 7b). This maintains the flux at approximately a constant level. As the rotor approaches the ON position, the current will decrease due to the increasing inductance. If the current level drooped enough during the generate phase due to an overload or a system fault, the current decrease due to the increasing inductance may result in a decrease of the current below the $I_{LO}$ current threshold at the point identified as "B". In order to prevent a further decay of the current, both switches 86, 88 are closed and the excitation portion of the commutation cycle is entered (see FIG. 7a). Since both switches 86, 88 are already closed, when the rotor angle exceeds the ON angle, both switches 86, 88 are simply maintained in the closed state (the excitation portion of the commutation cycle) and the phase current continues to increase. The current will increase until it reaches $I_{HI}$ (at point "A") and the cycle repeats. If the current does not reach $I_{HI}$, the response of FIG. 9 will govern.

Figure 1A:
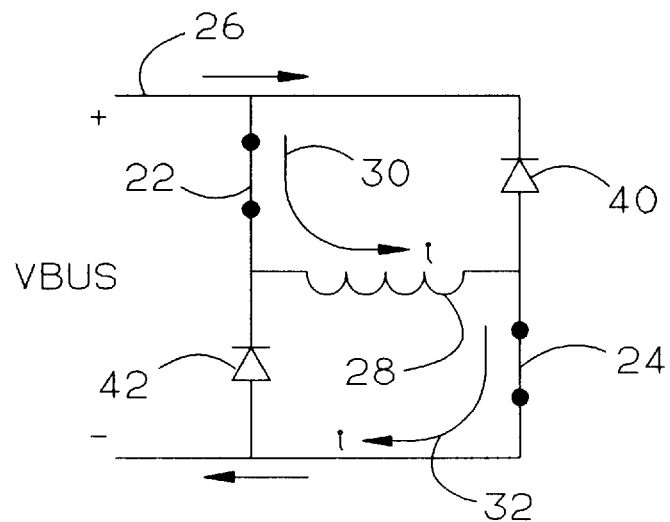
FIG. 1*a–b* are simplified schematic diagrams illustrating stages of switched reluctance commutation.
Figure 1B:
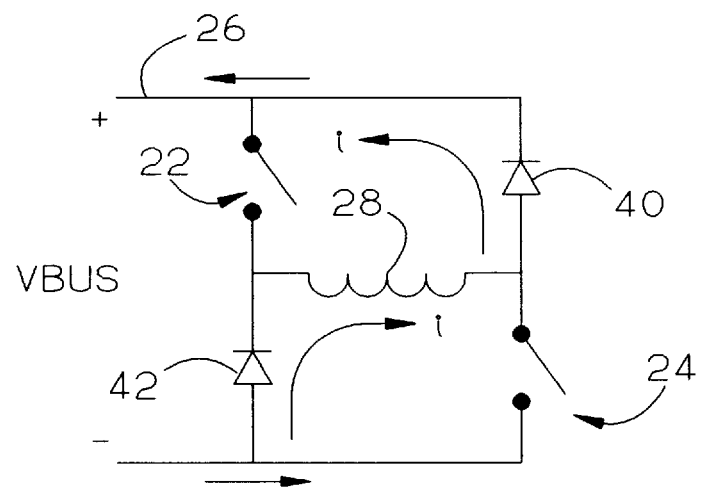
Figure 2:
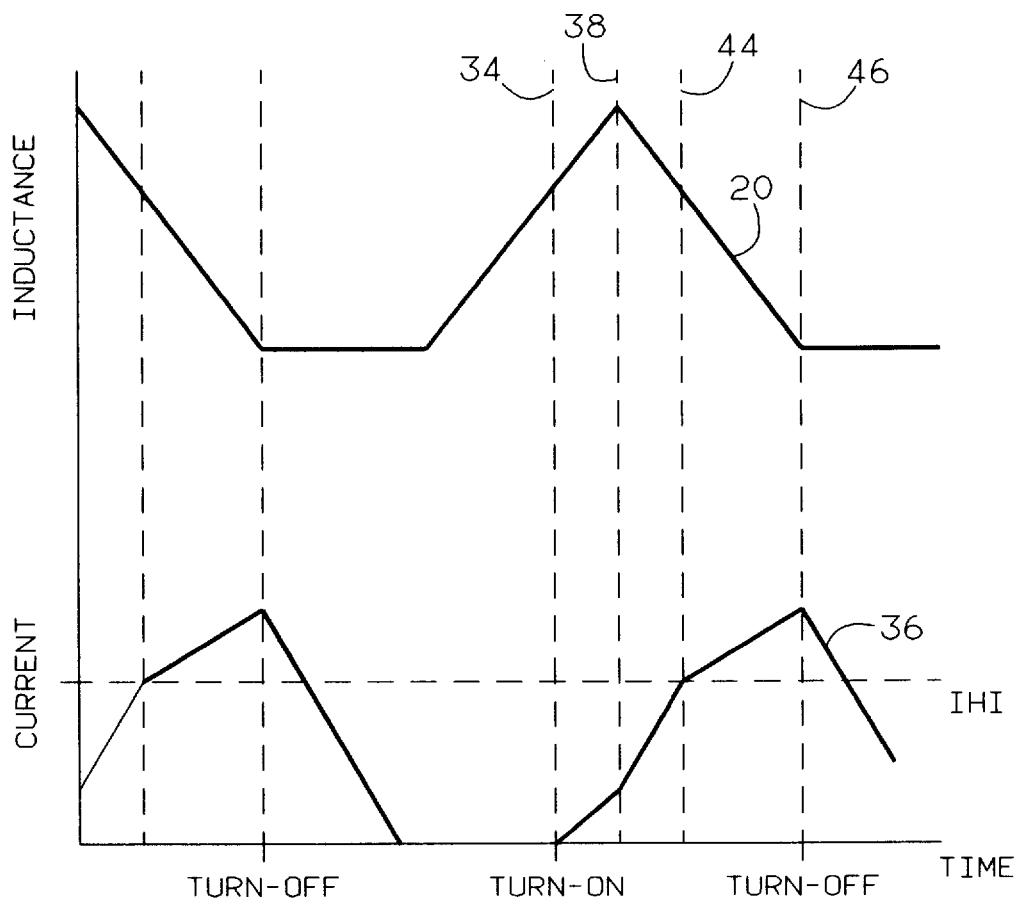
FIG. 2 is a graphical illustration of the stator winding inductance and current versus time during a prior art generate mode commutation approach.
Figure 11:
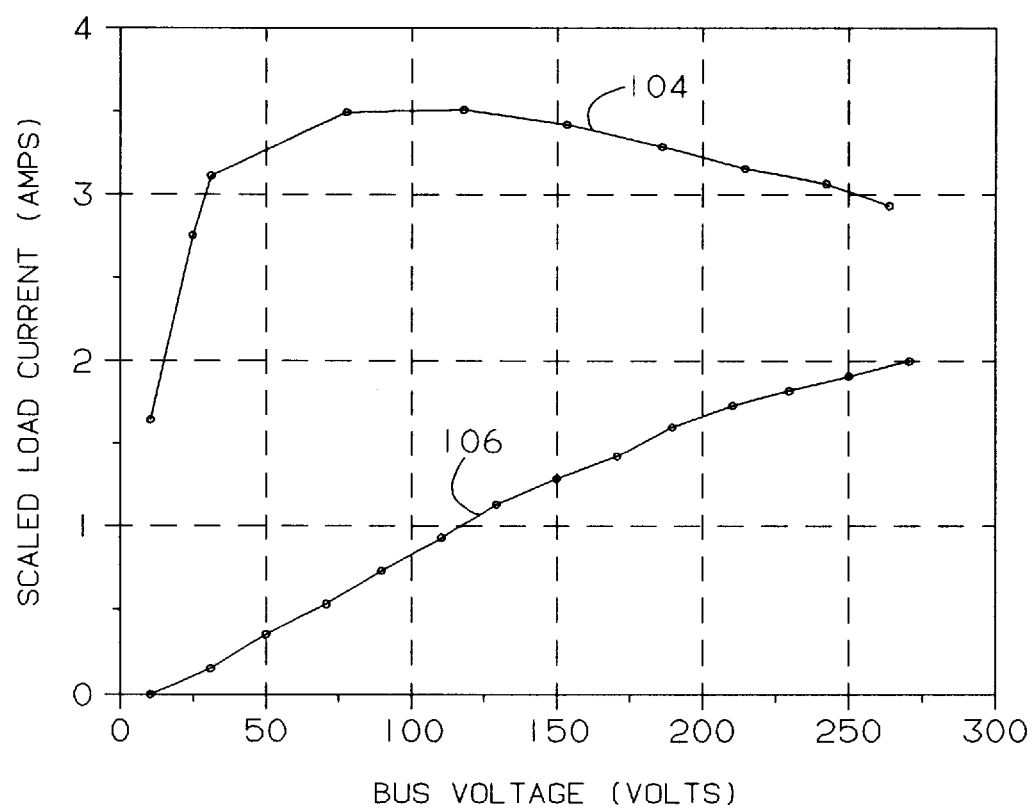
FIG. 11 is a graphical comparison chart illustrating the output current versus bus voltage for a conventional generate commutation approach and an embodiment of the generate commutation approach of the instant invention.

The commutation method of the instant invention increases the maximum output power at the design voltage as illustrated by FIG. 11 which illustrates the output current available versus bus voltage. Trace 104 is the output current available utilizing the commutation method of the instant invention, while trace 106 is the output from a conventional commutation method, such as is illustrated in FIG. 2. This increased power output greatly improves the response of the generator to an overload or a system fault.

The commutation method of the instant invention does not allow the current to zero at the end of the generating portion of the electrical cycle, and allows the current to freewheel for a period of time between the end of the excitation and the beginning of the generating portion of the electrical cycle as described above. Since the phase current that can be established is a function of the bus voltage and the speed, starting the commutation cycle from zero current (see FIG. 2) significantly limits the current that can be established in the phase winding during the excitation portion of the electrical cycle. By freewheeling the current at the end of the generating portion of the electrical cycle, the flux and current do not significantly decay before the beginning of the excitation portion of the next electrical cycle. With an initial value of current at the beginning of the excitation portion of the electrical cycle, the commanded current is reached sooner than the present commutation approaches, and/or a higher current can be reached. Reaching the commanded current more rapidly requires less excitation power and reaching a higher current at the end of the excitation portion of the cycle results in more power delivered to the load. In order to deliver currents higher than the maximum current obtained during the excitation portion of the electrical cycle, the current is allowed to freewheel for a period of time after the end of the excitation portion and before the generate portion of the electrical cycle. By selecting the control angles, the freewheeling occurs while the inductance is decreasing which results in phase currents that increase significantly without external excitation.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

I claim:

1. A method of commutation of a switched reluctance machine to allow operation in a venerate mode, the switched reluctance machine comprising a stator having a plurality of wound stator poles, the stator windings being electrically coupled in pairs, each of the pairs being switchably coupled by an upper and a lower switch to a bus capable of supplying excitation power to the windings, and by an upper and a lower unidirectional current flow device to a bus capable of supplying electric power to utilization equipment, the switched reluctance machine further comprising a rotor rotatably mounted within the stator and drivably coupled to an external source of rotational energy, the rotor having a plurality of salient poles, a rotation of the rotor causing an inductance of the stator windings to vary, the method comprising the steps of:

A) closing the upper and lower switches during an increase in the inductance of a stator winding;

B) monitoring a flow of current through the stator winding;

C) opening one of the upper and lower switches when the monitored current reaches a first predetermined value;

D) opening the closed of the upper and lower switches during a decrease in the inductance of a stator winding; and E) closing one of the upper and lower switches during substantially a whole period of non-alignment of the rotor and stator pole.

2. The method of claim 1, further comprising the step of closing both the upper and lower switches if the monitored current falls below a second predetermined value.

3. The method of claim 1, further comprising the step of monitoring an angle between the rotor pole and the stator pole.

4. The method of claim 3, wherein step A) is accomplished at a fixed angle prior to alignment of the rotor and stator pole.

5. The method of claim 3, wherein step D) is accomplished at a fixed angle after alignment of the rotor and stator pole.

6. The method of claim 3, wherein step E) is accomplished at a fixed angle during a period of non-alignment of the rotor and stator pole.

7. The method of claim 1, further comprising the step of
monitoring a voltage on the bus capable of supplying electric power to utilization equipment; and
varying the first predetermined value inversely to a variation in the monitored voltage.

8. A method of commutation of a switched reluctance machine to allow operation in a generate mode, the switched reluctance machine having wound stator poles and a rotor with salient poles rotatable therein, the method comprising the steps of:
exciting the stator winding during a first phase;
generating current during a second phase; and
freewheeling the stator winding during a third phase.

9. The method of claim 8, further comprising the steps of monitoring current flow through the stator winding, and freewheeling the stator winding during the first phase if the monitored current exceeds a first current limit.

10. The method of claim 8, further comprising the steps of monitoring current flow through the stator winding, and exciting the stator winding during the third phase if the monitored current falls below a second current limit.

11. The method of claim 8, wherein said first phase begins at a fixed angle prior to alignment of the rotor and stator poles.

12. The method of claim 11, wherein said first phase ends at a fixed angle after alignment of the rotor and stator poles.

13. The method of claim 8, wherein said second phase begins at a fixed angle after alignment of the rotor and stator poles.

14. The method of claim 13, wherein said second phase ends at a fixed angle during a period of non-alignment of the rotor and stator poles.

15. The method of claim 8, wherein said third phase begins at a fixed angle during a period of non-alignment of the rotor and stator poles.

16. The method of claim 15, wherein said third phase ends at a fixed angle prior to alignment of the rotor and stator poles.

17. An electric power generating system, comprising:

a switched reluctance machine having a wound stator and a salient pole rotor rotatably mounted therein, said rotor drivably coupled to a source of rotational energy, said stator having a plurality of poles wound with a winding to form pole pairs;

a power bus having a positive feeder and a return;

first switching means switchably coupling a first end of said winding to said positive feeder of said power bus;

second switching means switchably coupling a second end of said winding to said return of said power bus;

a first commutation means coupled between said second end of said winding and said positive feeder of said power bus;

a second commutation means coupled between said first end of said winding and said return of said power bus;

voltage sensing means in sensor communication with said positive feeder of said power bus for monitoring a voltage level thereon, said voltage sensing means generating a monitored voltage signal indicative of said monitored voltage;

current sensing means in sensory communication with said winding for monitoring a flow of current therethrough, said current sensing means generating a monitored current signal indicative of said monitored current;

rotor position sensing means for monitoring an angular position of said rotor, said rotor position means generating a monitored angle signal indicative of said rotor angular position; and a controller responsive to said monitored voltage, current, and angle signals for commutating said switched reluctance machine in a generate mode, said controller commanding said first and said second switching means closed at a fixed angle prior to alignment of said rotor and said stator pole, said controller thereafter commanding said first and said second switching means open at a fixed angle after alignment of said rotor and said stator poles, said controller thereafter commanding one of said first and said second switching means closed at a fixed angle of non-alignment of the rotor and stator poles for substantially a whole period of non-alignment of the rotor and stator poles.

18. The system of claim 17, wherein said controller maintains a current flow through said winding at all times during operation by commanding both said first and said second switching means closed when said monitored current droops below a lower current limit.

19. The system of claim 18, wherein said controller commands one of said first and said second switching means open when said monitored current exceeds an upper current limit.

20. The system of claim 19, wherein said controller varies said upper current limit inversely with said monitored voltage to regulate said voltage at a desired level.

* * * * *